United States Patent [19]

Collins

[11] 3,919,360

[45] Nov. 11, 1975

[54] PHOSPHOGLYCOLOHYDROXAMIC ACID AND DERIVATIVES THEREOF

[75] Inventor: Kim D. Collins, Houston, Tex.

[73] Assignee: Research Corporation, New York, N.Y.

[22] Filed: Apr. 5, 1974

[21] Appl. No.: 458,276

[52] U.S. Cl. ............... 260/943; 260/941; 424/211
[51] Int. Cl.² ........................................ C07F 9/09
[58] Field of Search .......................... 260/941, 943

[56] References Cited
UNITED STATES PATENTS 2,959,608  11/1960  Crouch et al. ............... 260/943 X
3,092,541  6/1963  Beriger ........................ 260/943 X Primary Examiner—Richard L. Raymond
Attorney, Agent, or Firm—Omri M. Behr

[57] ABSTRACT

There is provided a novel compound, P-glycolohydroxamic acid and the esters and salts thereof, which act as inhibitors of yeast aldolase but are not important inhibitors of rabbit muscle aldolase. This differential property permits their use as an antifungal and antibacterial in mammals.

7 Claims, No Drawings

PHOSPHOGLYCOLOHYDROXAMIC ACID AND DERIVATIVES THEREOF

BACKGROUND OF THE INVENTION

It has been shown by Morse and Horecker (Advan. Enzymol. 31, 125 (1968) that animals, such as mammals, have Class 1 aldolases whereas most bacteria and fungi have Class 2 aldolases. These aldolases play an important role in the metabolism of carbohydrates in the animal and bacterial and fungal systems. Thus interference with the enzymic function of the aldolases would interfere with carbohydrate metabolism. Such an interference with carbohydrate metabolism would be most desirable in the case of bacteria and fungi provided that such interference did not take place in the animal or host metabolism. It would therefore be desirable to provide a substance which possessed this differential function — namely, interference with class 2 bacterial and fungal aldolases and non-interference with animal class 1 aldolases.

SUMMARY OF THE INVENTION

There is provided a novel compound, phosphoglycolohydroxamic acid and salts thereof with certain bases, which have the property of interfering with the metabolic function of Class 2 bacterial and fungal aldolases and being substantially non-interfering with the metabolic function of animal or mammal aldolases.

The phosphoglycolohydroxamic acid subject of the present invention is prepared from Barium P-glycolate by conversion to P-glycolic acid which in turn is converted to a corresponding ester. This ester is treated with alkaline hydroxylamine, the thus produced P-glycolohydroxamic acid is isolated in the form of a salt, suitably an alkali metal salt.

DESCRIPTION OF THE PREFERRED EMBODIMENTS

In the text of the present application the prefix P- is used interchangeably with the prefix phosphothus P-glycolohydroxamic acid is the same compound as phosphoglycolohydroxamic acid.

The starting material of the procedure preparing the compound of the present invention is a P-glycolate ester suitably a P-glycolate ethyl ester which is prepared in accordance with modifications of known syntheses which are specifically referred to in the examples hereinbelow.

Barium phosphoglycolate is prepared by treating an alkali metal salt of alphaglycerophosphoric acid suitably disodium glycerophosphatehexahydrate with freshly prepared periodic acid suitably prepared by dissolving sodium metaperiodate in an aqueous hydrochloric acid. Potassium iodide followed by concentrated acid, suitably concentrated hydrochloric acid, is added whereby some iodine is precipitated. A reaction mixture is made alkaline by the addition of sodium carbonate and quenched by the addition of more mineral acid, suitably concentrated hydrochloric acid. The thus produced iodine is removed by filtration followed by extraction of the aqueous medium with a suitable solvent such as chloroform. Not all the residual iodine is thus removed, however no problems are created thereby. A solution of barium acetate in barium hydroxide is added to the aqueous phase and the mixture allowed to stand at ambient temperature for from about 8 – 12 hours after which the aqueous solvent is removed under reduced pressure and the thus prepared barium phosphoglycolate purified. Suitably the purification involves suspension in acid, removal of constituents which are insoluble in a slightly alkaline medium followed by further alkalinization and collection of the resulting precipitate.

The thus prepared barium phosphoglycolate is converted into the corresponding phosophoglycolate acid, preferably by passage through a suitable ion exchange resin in the H+ form. Elution of a column containing such resin with a mineral free water provides an eluate containing the phosphoglycolic acid which is then separated from the aqueous solvent suitably by evaporation under reduced pressure.

The ester, suitably the ethyl ester of phosphoglycolic acid is prepared by acidifying an ethanolic solution of the acid. In the preferred modification the phosphoglycolic acid is taken up in dry ethanol and dry hydrogen chloride gas passed therethrough until saturation is noted. The acid is then isolated by evaporation of the solvent under reduced pressure.

The P-glycolate ester, suitably an alkyl ester such as the ethyl ester, is then treated with an aqueous solution of alkaline hydroxylamine, suitably prepared by the addition of a strong base, such as lithium hydroxide, to an aqueous solution of a hydroxylamine salt, preferably a mineral salt such as the hydrochloride. After standing at ambient temperature for a short time, say about 15 minutes, the pH of the solution is lowered to just above neutrality, say between 7.5 and 8.5, by the addition of a mineral acid, for example, aqueous hydrochloric acid and an equal volume of an alkanol, suitably ethanol, added thereto. A solid precipitate consisting principally of dilithium P-glycolohydroxamic acid is produced. This is washed with cold alkanol, suitably 95% ethanol, redissolved in water and reprecipitated. Further purification may be carried out by solution in water and extraction with quinoline chloroform followed by flash evaporation of the aqueous phase to yield dilithium P-glycolohydroxamic acid in about 90% purity.

Alternatively, in place of treating the reaction mixture containing the hydroxylamine salt with lithium hydroxide, potassium hydroxide may be utilized. After completion of the reaction barium acetate is added whereby there is precipitated the barium P-glycolohydroxamic acid. This latter procedure results in a more efficient and selective removal of P-glycolohydroxamate from the reaction mixture.

The material is then further purified in the following manner:

In the preferred procedure, it is converted into a substituted ammonium salt, such as an alkyl, cycloalkyl, or dicycloalkyl ammonium salt, wherein the alkyl group contains one to six carbon atoms. Most suitably there is prepared the di (substituted) ammonium salt containing most preferably a single substituent group. Among the especially preferred substituent groups is the cyclohexyl group. Thus a resin column, suitably a sulfonated polyvinylstyrene resin column such as an AG 50WX8 or CHELEX 100 (both manufactured by Biorad Laboratories, Richmond, California) resin column is converted into the monocyclohexylammonium form of the resin.

Where the dilithium salt had been previously prepared, an aqueous solution of the salt is passed through the column to yield an aqueous solution of P-glycolohydroxamic acid in the form of the dimonocyclohexylammonium salt solution eluate. Where the P-glycolohydroxamic acid is first prepared in the form of the barium salt, a suspension is prepared in water and the suspension gently agitated with the aforementioned resin until total solution occurs. The column method is not suitable due to the rather low solubility of the barium salt. However, the solubility thereof is sufficient to enable exchange to take place under equilibrium conditions.

In either case, the aqueous solution containing the dimonocyclohexylammonium salt is crystallized from water/acetone.

Where it is desirable to provide alkali metal salts, such as the dipotassium salt of P-glycolohydroxamic acid in reasonably pure form, a column of similar resin in, say the potassium form, may be employed.

The pure acid may be obtained by briefly stirring a solution of the dimonocyclohexylammonium salt — with a suspension of AG 50W-X8 resin in cold water (ca. 4°C.) decanting the resin, quickly freezing the aqueous portion and removing the water by lyophilization. The free acid however is unstable and since, when used as an antibacterial or antifungal would immediately attach itself to a counter ion in the biological fluid in which it finds itself, there is no point in preparing and isolating the acid in its free form.

The esters of P-glycolohydroxamic acid are prepared by a different route:

Any pharmacologically acceptable esters may be employed. Lower alkyl esters containing 1 – 6 carbon atoms such as methyl, ethyl, butyl, hexyl, or higher esters, up to $C_{20}$ alcohols, may also be used. Also, within the scope of the invention are cyclo alkyl esters ($C_3$ to $C_7$) and phenyl alkyl such as benzyl or phenethyl esters and phenyl esters.

The esters are produced in two steps. Any appropriate glycolate ester, say the methyl ester, is treated with the appropriate phosphorochloridate diester, for example the diphenylphosphorochloridate in a dry amine, suitably pyridine, lutidine or a mixture thereof at ambient temperature. Quenching in ice water and extractive work up yield the (say) diphenylphosphoglycolate methyl ester.

The methyl ester is converted into the corresponding hydroxamic acid by treatment of a methanolic solution with aqueous neutral hydroxylamine.

The P-glycolohydroxamic acid, the esters and the salts thereof, in particular the dimonocyclohexylammonium salt have been found to be effective inhibitors of yeast aldolase. On the other hand, they are a poor inhibitors, in the same circumstances, of rabbit muscle aldolase.

The differential activity shows that the P-glycolohydroxamic acid, its esters and its salts possess bactericidal and fungicidal properties while not significantly disturbing mammalion metabolism under the same conditions. Activity against E. coli has been noted.

EXAMPLE I

Synthesis of Barium Phosphoglycolate (Adaptation of method of Fleury and Courtois, Bull. Soc. Chem. (Fr.) 8, 69 (1941)

To a solution of aqueous hydrochloric acid (1.6 l water, 40 ml concentrated hydrochloric acid 12.1 N, 0.48 moles) is added sodium metaperiodate (25 g, 0.117 moles) and the mixture agitated to solution. Disodium alphaglycerophosphate hexahydrate (26 g, 0.08 moles) is added rapidly and dissolved with agitation. The mixture is allowed to stand at ambient temperature with agitation for two hours.

Potassium iodide (50 g. 0.3 moles) are added followed by a concentrated hydrochloric acid (16 ml, 0.192 moles). A black precipitate of iodine is immediately noted. Anhydrous sodium carbonate (102.6 g, 0.968 moles) is added and mixture stirred for about 1.25 hours. The pH of the reaction mixture is between 9 and 10. Agitation is continued for 5.5 hours.

Concentrated hydrochloric acid (160 ml, 1.92 moles) is added to lower the pH to about 1 whereby iodine is again precipitated. A substantial proportion of the iodine is removed by filtration on a sintered glass funnel. The aqueous medium is extracted with chloroform (7 × 250 ml) whereby most, though not all of the residual iodine is removed. Barium acetate (30 g, 0.117 moles) is added to the solution to which is further added a freshly prepared and filtered solution of barium hydroxide (2 l, 30 g/l) to give a solution of pH of about 10. The reaction mixture is left at ambient temperature for about 12 hours. The solution is concentrated at a bath temperature of about 35° to 40° in a flash evaporator down to about 300 ml. A white precipitate is formed which is then isolated by filtration. The precipitate is substantially barium phosphoglycolate which is purified as follows:

The precipitate is re-suspended in dilute aqueous nitric acid (2 l, 0.01 N), concentrated nitric acid (2 N, ca 120 ml) is added to lower the pH to 2.5 and, upon vigorous agitation, dissolve the precipitate. Aqueous sodium hydroxide (1 M) is added until the solution becomes slightly cloudy. The cloudy solution is then filtered through filter paper and the precipitate discarded. Further aqueous sodium hydroxide is added and the pH raised to about 9 – 10 and allowed to stand at ambient temperature for 12 hours. The thus produced precipitate is collected on a sintered glass funnel, washed with ethanol and superficially dried to yield barium phosphoglycolate in suitable purity for the next step.

EXAMPLE II

Preparation of Phosphoglycolic Acid (Method of Zelitch, J. Biol. Chem. 240, 1869 (1965)).

Barium phosphoglycolate (28.5 g) is ground into a thin paste. A column of AG50W-X8 resin in H+ form (200–400 mesh, 2.7 cm. diam × 32 cm) is prepared and the aforementioned paste stirred into the top ⅛ of the column. The column is then washed with water until all the phosphoglycolic acid (judged by Schleiren patterns) is eluted. The thus prepared eluate is concentrated to dryness at a bath temperature of 40°C. on a rotary evaporator and then stored under vacuum over phosphorous pentoxide. There is obtained an oil (10.4 g. (83% yield) which solidifies and may be ground into a white powder.

EXAMPLE III

Preparation of Phosphoglycoloethyl Ester (Modification of method of Greenstein and Winnitz, Chemistry of the Amino Acids 2, 927 (1961)).

Phosphoglycolic acid (10.4 g, 66.5 m moles) is dissolved in previously dried (over molecular sieves 4 A)

ethanol (150 ml). The ethanolic solution is vigorously agitated in a container insulated from atmospheric moisture, and gaseous hydrogen chloride, previously passed through concentrated sulfuric acid, is played onto the surface of the solution until the solution is saturated. The reaction mixture is allowed to stand at ambient temperature for 5 hours and the solvent removed by flash evaporation at a bath temperature of about 40°C. The thus prepared phosphoglycoloethyl ester is an oil which is utilized in the next step.

EXAMPLE IV

Preparation of Dilithium Phosphoglycolohydroxamate

An aqueous solution of hydroxylamine hydrochloride (8M. 100 ml) is added to an aqueous solution of lithium hydroxide (5M, 218.2 ml) at ice bath temperatures, and the mixtures agitated. This solution is then added to the phosphoglycoloethyl ester prepared in the previous example with stirring. White globular precipitates are immediately formed. Approximately 80 ml of water are added with vigorous stirring and substantially all the precipitate dissolved. After stirring at room temperature for about 15 minutes, the pH is reduced to 8.5 by the addition of aqueous hydrochloric acid (4M) to yield a total of liquid volume of about 500 ml. An equal volume of cold ethanol (95%) is added and a precipitate forms immediately. After 10 minutes at room temperature the flocculant precipitate is thoroughly washed with ethanol and compacted on the funnel. The material is redissolved in water (400–450 ml) and ethanol (95%, 500 ml) is added. This procedure is repeated and then the isolated precipate redissolved in water (330 ml.) and extracted with quinolinol/chloroform (1:99, 2 × 330 ml.) and then with chloroform (200 ml.). The sequence of extraction is then repeated once more to yield a very lightly yellow aqueous phase. This aqueous phase is evaporated to dryness in a rotary evaporator at a temperature of about 30° to 40° and pumped in a desicator for 5 days over phosphorous pentoxide to yield the desired dilithium salt of p-glycolohydroxamic acid.

EXAMPLE V

Barium P-glycolohydroxamate

Hydroxylamine hydrochloride solution (8 m, 100 ml.) is added to an ice cooled solution of potassium hydroxide (5M, 220 ml.). The cooled solution is then added, with agitation, to the P-glycoloethyl ester of Example III. The mixture is allowed to stand at ambient temperature for 15 minutes and then brought to pH 8.5 by the addition of aqueous hydrochloric acid (4M). At this point the total volume is about 500 ml. There is then added an aqueous solution of barium acetate (2M, 35 ml.). The mixture is stirred at ambient temperature for 15 minutes to yield barium phosphoglycolohydroxamate as a precipitate of sufficient purity to be utilized in the next stage of the reaction. The barium salt is isolated by filtration on a glass sinter and is washed with ethanol.

EXAMPLE VI

Di-Monocyclohexylammoniumphosphoglycolohydroxamate

Dilithiumphosphoglycolohydroxamate (4g.) is dissolved in water. AG 50W-X8 resin (200–400 mesh) is prepared in the cyclohexylammonium form and charged to a column (3.8cm diam, × 37.5cm). The aqueous solution of the lithium salt is run thru the column which is eluted with de-ionized water. All liquid giving a brown color with ferric chloride when spotted on filter paper is pooled and evaporated to dryness at 35° bath temperature on a rotary evaporator to yield dimonocyclohexylammoniumphosphoglycolohydroxamate.

EXAMPLE VII

Di-Monocyclohexylammoniumphosphoglycolohydroxamate

Bariumphosphoglycolohydroxamate (6.5g) is suspended in water (500 ml.) AG 50W-X8 resin (200 – 400 mesh) is prepared in the cyclohexylammonium form. 230 ml. of this resin is added to the suspension of the barium salt and agitated gently until all of the barium salt has gone into solution. The resin with its suspending liquid is poured into the top of a column (3.8 cm. diam.) already containing AG 50W-X8 resin (230 ml., 200 – 400 mesh) in the cyclohexylammonium form. The column is then eluted with water and all material giving a brown color with ferric chloride when spotted on filter paper is pooled and evaporated to dryness under reduced pressure in a rotary evaporator at bath temperature of 35°.

EXAMPLE VIII

Purification of Di-Monocyclohexylammoniumphosphoglycolohydroxamate (Adaptation of method of Ballou and McDonald Methods in Carbohydrate Chemistry 2, 272 (1963) Academic Press, New York.)

The white solid obtained from the removal of the water after the foregoing step (either Example VI or Example VII) is taken up in the minimum amount of water and acetone added until the solution just becomes cloudy. The solution is then swirled under hot water from a faucet (circa 80°C.) and acetone continuously added until the solution again becomes cloudy. There is thus produced a small amount of solid white material which does not redissolve upon addition of further water. This material is removed by sequential filtration thru (a) Whatman No. 1 filter paper (single sheet) (b) Celite 545 (acid washed) over Whatman No. 1 filter paper (2 sheets) and a fine sinter funnel. The clear filtrate is allowed to stand overnight at about 4°C, whereupon the desired product crystallizes from the solution and is harvasted on a sintered glass funnel.

The dimonocyclohexylammonium salt of P-glycolohydroxamic acid is spotted on a polyethyleneimine cellulose thin layer plate (E. Merck, Darmstadt, Germany), and the plate developed with 0.7 M LiCl. Using the detection procedure of Bandurski and Axelrod the compound gave a single spot with an $R_f$ of 0.62 and a brown color when sprayed with 0.74 M $FeCl_3$ in 0.1 M HCl. A solution of dimonocyclohexylammonium P-glycohydroxamate in 0.148 M $FeCl_3$ absorbes in the visible region with a $\lambda_{max}$ of 500 nm; the absorbance of the solution initially reaching a maximum of about 4 min. after mixing, at which time P-glycolohydroxamate has a molar absorbance of 1020 at glycolohydroxamate has a molar absorbance of 1020 at 500 nm. Thereafter, the absorbance decreases with a pseudofirst order rate constant of $2.6 \times 10^{-5} s^{-1}$ at 23°. Under the same conditions, the color formed with acetohydroxamate does not change with time.

$_{max}$KBr: 1660 (—c=o), 1565 (—NH) cm$^{-1}$.

EXAMPLE IX

Di-potassium P-glycolohydroxamate 2.7 g. of Dimonocyclohexylammonium P-glycolohydroxamic acid are converted to the di-potassium salt (which proved to be hygroscopic) by passage thru a column of AG 50W-X8 (−200 to 400 mesh) resin in the potassium form at room temperature. This procedure contaminates the sample with $Fe^{3+}$ (which catalyzes the hydrolysis of P-glycolohydroxamic acid) as judged by the light yellow color of the concentrated column effluent. Elemental analysis of the di-potassium salt of P-glycolohydroxamic acid gives a nitrogen to phosphorus molar ratio of 1.045 (1.0 is expected).

A 60-MHz proton nuclear magnetic resonance spectrum of dipotassium P-glycolohydroxamic acid in $D_2O$ revealed that the methylene protons were centered at 4.375 ppm (all chemical shifts were measured relative to an external tetramethylsilane standard) and were split by 6.3 cycles into a doublet by the phosphorus. A small peak was present at 4.24 ppm; this peak approximately doubled in size after storage at room temperature for 38 hours, and represented one peak of the P-glycolate doublet. The contaminating $Fe^{3+}$ from the Ag 50W-X8 (K$^+$) column apparently catalyzed the hydrolysis of P-glycolohydroxamic acid to P-glycolate; at the time of the first spectrum, it was estimated that 3% or less of the P-glycolohydroxamic acid had been hydrolyzed to P-glycolate. Crystalline dimono cyclohexylammonium P-glycolohydroxamic acid dissolved in $D_2O$ had no contaminating P-glycolate as judged by nuclear magnetic resonance spectroscopy.

EXAMPLE X

Synthesis of Diphenylphosphoglycolate Methyl Ester 25 g. (0.2775 moles) of methyl glycolate (Aldrich Chemical Co.) is dissolved in about 100 ml. of dry lutidine and cooled to 4°C. 78 g. (0.29 moles) of dry diphenylphosphorochloridate in 100 ml. dry pyridine is added and the mixture is allowed to stand at room temperature for 6 hours. A few drops of water are added to destroy excess diphenylphosphorochloridate, and after 10 minutes the reaction mixture is poured into 250 ml. ice water. The product is extracted into an equal volume of chloroform and the chloroform phase is concentrated by vacuum distillation at 35°C in a rotary evaporator yielding the product as an oil of sufficient purity for use in the next step of the synthesis.

EXAMPLE XI

Synthesis of Diphenylphosphoglycolohydroxamic Acid

An aqueous solution of hydroxylamine hydrochloride (8M, 400 ml.) at 4°C is added to an aqueous solution of potassium hydroxide (8M 200 ml.) at 4°C. 89.4g. (0.2775 moles) of diphenylphosphoglycolate methyl ester is dissolved in 200 ml. methanol, mixed with the hydroxylamine solution, and violently stirred at 37° for 12 hours. The solvent is then removed under vacuum at 35° on a rotary evaporator, and product is purified in batches on a column (4cm diam. × 40 cm) of silica gel G eluted with 80:20 (V:V) methanol/benzene. All fractions which are positive for phosphate using the detection system of Bandurski and Axelrod and which give a brown color with ferric chloride when spotted on filter paper are pooled and evaporated to dryness by vacuum distillation at 35°C in a rotary evaporator.

I claim:

1. Phosphoglycohydroxamic acid, the salts thereof with inorganic bases wherein the cations of said bases are selected from the group consisting of an alkali metal, an alkaline earth metal, and substituted ammonium wherein the substituent group is alkyl, wherein alkyl signifies 1–6 carbon atoms, cycloalkyl and dicycloalkyl of up to 6 carbon atoms and the esters thereof with hydroxy compounds selected from the group cnsisting of alkyl alcohols of 1 to 20 carbon atoms, cyclo alkanols of 3 to 7 carbon atoms, phenol, and phenyl alkyl alcohols wherein the alkyl group contains 1 to 2 carbon atoms.

2. Phosphoglycolohydroxamic acid being a compound of claim 1.

3. Di-potassium phosphoglycolohydroxamic acid being a compound of claim 1.

4. Di-lithium phosphoglycolohydroxamic acid being a compound of claim 1.

5. Barium phosphoglycolohydroxamic acid being a compound of claim 1.

6. Di-monocyclohexylammonium phosphoglycolohydroxamic acid being a compound of claim 1.

7. The diphenyl ester of phosphoglycolohydroxamic acid being a compound of claim 1.

* * * * *